United States Patent
Lin

(10) Patent No.: US 8,004,628 B2
(45) Date of Patent: Aug. 23, 2011

(54) BACKLIGHT MODULE, LAMP HODER AND LIQUID CRYSTAL DISPLAY USING SAME

(75) Inventor: Yi-Fu Lin, Miao-Li (TW)

(73) Assignee: Chimei Innolux Corporation, Miao-Li County (TW)

( * ) Notice: Subject to any disclaimer, the term of this patent is extended or adjusted under 35 U.S.C. 154(b) by 279 days.

(21) Appl. No.: 12/214,964

(22) Filed: Jun. 23, 2008

(65) Prior Publication Data
US 2008/0316394 A1    Dec. 25, 2008

(30) Foreign Application Priority Data
Jun. 22, 2007    (CN) .......................... 2007 1 0076203

(51) Int. Cl.
*G02F 1/1333*    (2006.01)
(52) U.S. Cl. ........................................... 349/56
(58) Field of Classification Search ........................ None
See application file for complete search history.

(56) References Cited

U.S. PATENT DOCUMENTS

| 6,224,241 B1 * | 5/2001 | Oswald .......................... 362/267 |
| 6,802,758 B2 * | 10/2004 | Somers .......................... 446/242 |
| 7,137,726 B2 | 11/2006 | Lee et al. |
| 2004/0257792 A1 * | 12/2004 | Yu et al. .......................... 362/31 |

FOREIGN PATENT DOCUMENTS

| CN | 1567059 A | 1/2005 |
| CN | 1285002 C | 11/2006 |

* cited by examiner

*Primary Examiner* — Mark A Robinson
*Assistant Examiner* — Mary A El-Shammaa
(74) *Attorney, Agent, or Firm* — Wei Te Chung

(57) ABSTRACT

An exemplary backlight module includes a diffuser plate, a bottom plate facing the diffuser plate, lamps arranged between the diffuser plate and the bottom plate, and holders positioned between the diffuser plate and the bottom plate. Each holder includes a fixing part for holding the corresponding lamp, and two supporting parts extending from the fixing part. The supporting parts are configured for supporting the diffuser plate.

19 Claims, 5 Drawing Sheets

BACKLIGHT MODULE, LAMP HODER AND LIQUID CRYSTAL DISPLAY USING SAME

CROSS-REFERENCE TO RELATED APPLICATION

This application is related to, and claims the benefit of, a foreign priority application filed in China as Serial No. 200710076203.9 on Jun. 22, 2007. The related application is incorporated herein by reference.

FIELD OF THE INVENTION

The present invention relates to a backlight module, a lamp holder employed in the backlight module, and a liquid crystal display (LCD) device using the same backlight module.

GENERAL BACKGROUND

LCD devices are commonly used as displays for compact electronic apparatuses because they provide good quality images with little power consumption and are very thin. The liquid crystal material in an LCD device does not emit light. The liquid crystal material must be lit by a light source to clearly and sharply display text and images. Thus, a backlight module is generally needed for an LCD.

Referring to FIG. 9, a typical backlight module 100 includes a diffuser plate 110, a bottom panel 120, a plurality of lamps 130, and a plurality of lamp fixing devices 140. The lamp fixing devices 140 are positioned between the diffuser plate 110 and the bottom panel 120. The lamps are positioned in the lamp fixing devices 140.

Each lamp fixing device 140 includes a base part 141 and a C-shaped holder 142 arranged on the base part 141. The C-shaped holder 142 is glued with the base part 141 or connected with the base part 141 via a screw (not shown). The C-shaped holder 142 is configured to receive the lamp 130. The width of the opening of the C-shaped holder 142 should be less than the diameter of the lamp 130 such that the lamp 130 is firmly fixed when the lamp 130 is pressed into the C-shaped holder 142.

If the size of the LCD device is large, the size of the diffuser plate 110 must be correspondingly large. When the lamp 130 emits light, the lamp 130 also radiates heat, thereby increasing the temperature in the internal space of the backlight module 100, potentially deforming the diffuser plate 110 and changing the optical properties of the backlight module 100.

Therefore, an improved backlight module is desired to overcome the above-described deficiencies.

SUMMARY

In one exemplary embodiment, a backlight module includes a diffuser plate, a bottom plate facing the diffuser plate, a plurality of lamps, and a plurality of holders positioned between the diffuser plate and the bottom plate. The holder comprises a fixing part for holding the lamps and two supporting parts extending therefrom, with at least one of the supporting parts configured to support the diffuser plate.

Other novel features and advantages will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of at least one embodiment of the present invention. In the drawings, like reference numerals designate corresponding parts throughout the various views.

DETAILED DESCRIPTION OF PREFERRED EMBODIMENTS

Reference will now be made to the drawings to describe preferred and exemplary embodiments of the present invention in detail.

Figure 1:
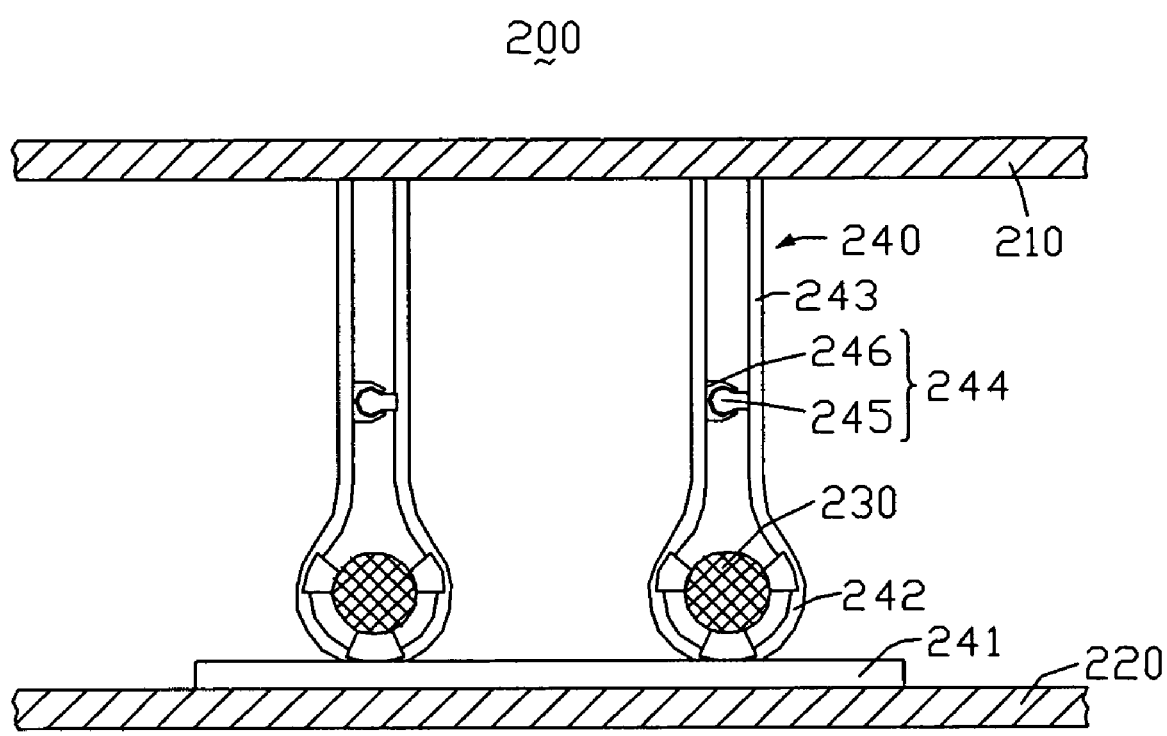
FIG. 1 is a cross-sectional view of a backlight module according to a first embodiment of the present invention, the backlight module including a holder.

Referring to FIG. 1, a backlight module 200 according to a first embodiment of the present invention is shown. The backlight module 200 includes a diffuser plate 210, a bottom plate 220, a plurality of lamps 230, and a plurality of holders 240 that hold the lamps 230 and support the diffuser plate 210. The holder 240 is positioned between the diffuser plate 210 and the bottom plate 220.

The holder 240 includes a C-shaped fixing part 242, two supporting parts 243 extending from both ends of the C-shaped fixing part 242 to support the diffuser plate 210, a latch element 244 for tying the two supporting parts 243 together, and a base part 241 connected to the C-shaped fixing part 242.

The base part 241 is glued to the bottom plate 220 or connected to the bottom plate 220 via a fastener such as a screw (not shown). The C-shaped fixing parts 242 are configured for receiving the lamps 230. The width of an opening of each C-shaped fixing part 242 should be slightly less than the diameter of each lamp 230.

Figure 2:
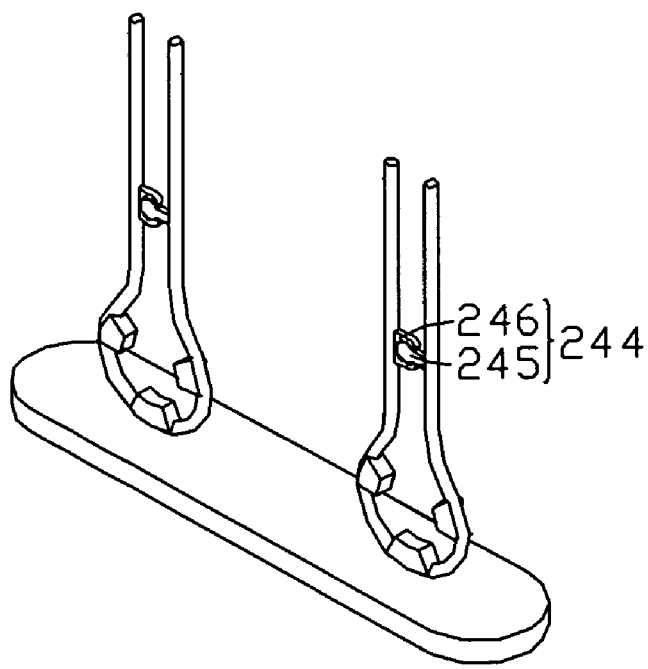
FIG. 2 is a schematic, isometric view of the holder employed in the backlight module of FIG. 1, the holder including a latch element.

Referring also to FIG. 2, the latch element 244 includes a protrusion 245 formed on one supporting part 243 and a receiving unit 246 formed on the opposite supporting part 243 for receiving the protrusion 245. A cross-section of the receiving unit 246 is substantially a C-shape. A cross-section of the protrusion 245 is a round shape which has a diameter that is slightly less than the internal diameter of the C-shaped receiving unit 246 and slightly larger than the width of an opening of the C-shaped receiving unit 246. The protrusion 245 partly encloses the receiving unit 246, latching the supporting parts 243 together.

The backlight module 200 is assembled by separating the two supporting parts 243 so that the lamps 230 can be placed in the C-shaped fixing parts 242. Then, the two supporting parts 243 are reattached via the latch element 244.

The supporting parts 243 also function as a support for the diffuser plate 210 and prevent deformation of the diffuser plate 210 in a high temperature environment, thereby improving the optical properties of the backlight module 200. Furthermore, the supporting parts 243 would be difficult to deform or shift because the latch element 244, when engaged, increases the overall stiffness of the holder. Thus, the stability of the backlight module 200 is improved.

Figure 3:
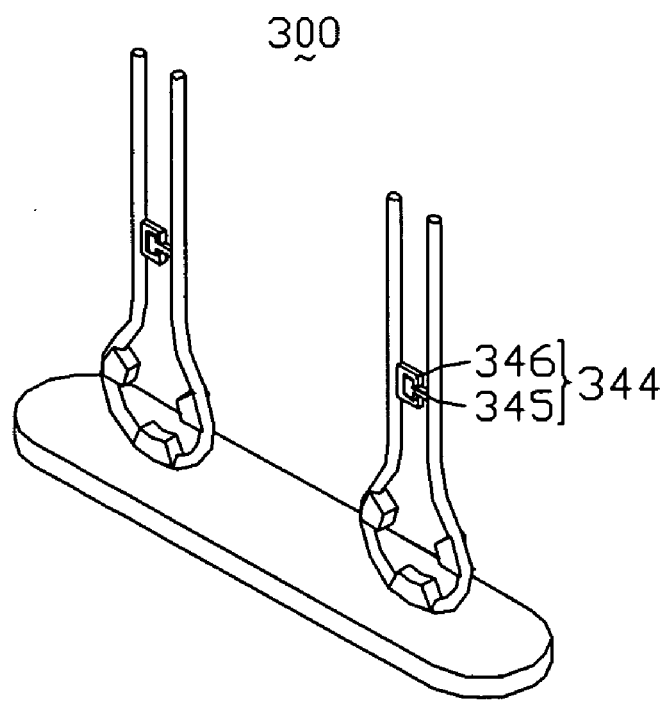
FIG. 3 is a schematic, isometric view of a holder according to a second embodiment of the present invention, the holder including a T-shaped latch element.

Referring to FIG. 3, a backlight module 300 according to a second embodiment of the present invention is shown. The backlight module 300 is similar to the backlight module 200 in FIG. 1 except that cross-sections of a receiving unit 346 and a protrusion 345 of a latch element 344 are T-shaped.

Figure 4:
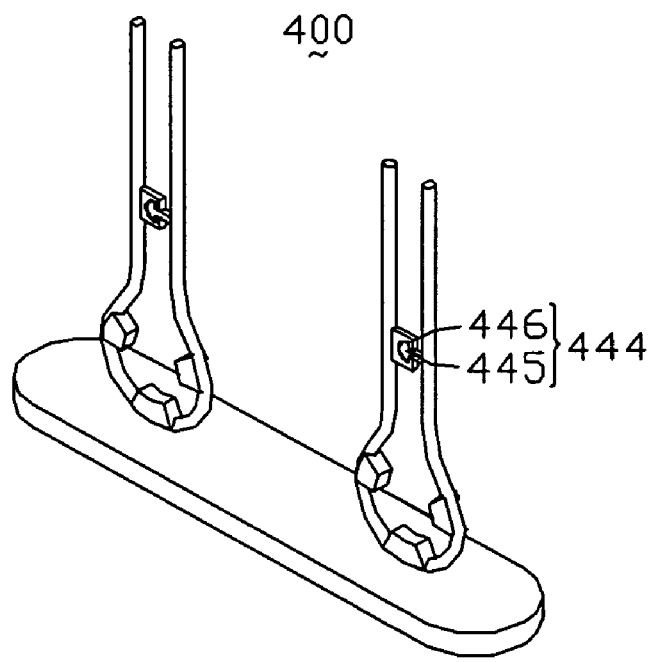
FIG. 4 is a schematic, isometric view of a holder according to a third embodiment of the present invention, the holder including an umbrella-shaped latch element.

Referring to FIG. 4, a backlight module 400 according to a third embodiment of the present invention is shown. The backlight module 400 is similar to the backlight module 200 in FIG. 1 except that cross-sections of a receiving unit 446 and a protrusion 445 of a latch element 444 are umbrella shaped.

Figure 5:
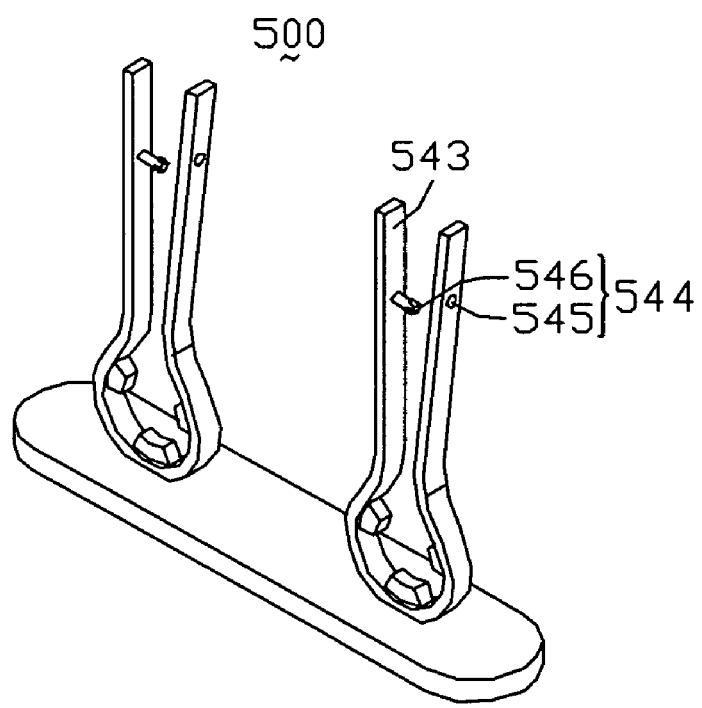
FIG. 5 is a schematic, isometric view of a holder according to a fourth embodiment of the present invention, the holder including a latch element having a protrusion and a through hole.

Referring to FIG. 5, a backlight module 500 according to a fourth embodiment of the present invention is shown. The backlight module 500 is similar to the backlight module 200 in FIG. 1 except that a latch element 544 includes a fixing peg 546 formed on one supporting part 543 with an elastic part at the tip, and a through hole 545 in the opposite supporting part 543 for receiving the deformed elastic part of the fixing peg 546. A cross-section of the supporting part 543 is a rectangle (not shown). The two supporting parts 543 define an included angle therebetween.

The rectangular cross-sections of the supporting parts 543 increases the stiffness of the supporting parts 543. Furthermore, the supporting parts 543 are angled with respect to the diffuser plate 210 adding to the overall stiffness of the supporting parts 543.

Figure 6:
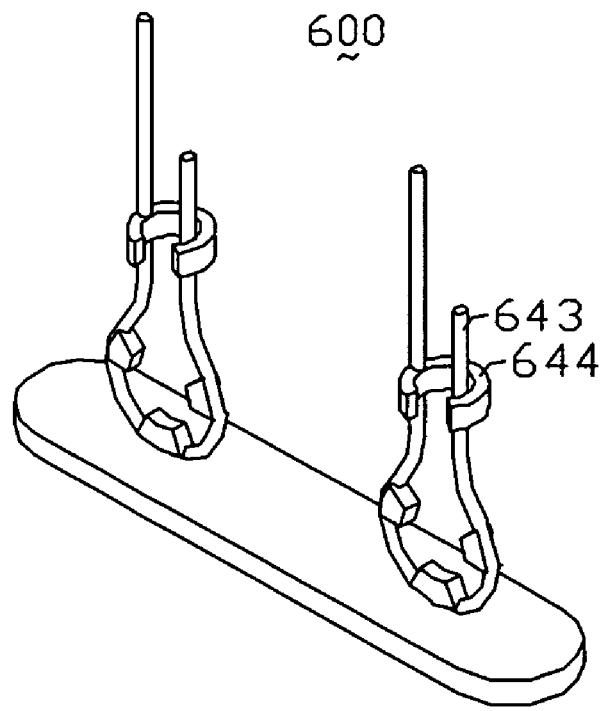
FIG. 6 is a schematic, isometric view of a holder according to a fifth embodiment of the present invention, the holder including a C-shaped latch element.

Referring to FIG. 6, a backlight module 600 according to a fifth embodiment of the present invention is shown. The backlight module 600 is similar to the backlight module 200 in FIG. 1, except that a latch element (not labeled) includes a C-shaped fixing unit 644 formed on one supporting part 643 such that the opposite supporting part 643 slides into the C-shaped fixing unit 644 via an opening of the C-shaped fixing unit 644. The C-shaped fixing unit 644 is arranged in a plane substantially perpendicular to the supporting parts 643. The two supporting parts 643 have different lengths so that only one supporting part 643 supports the diffuser plate 210.

Figure 7:
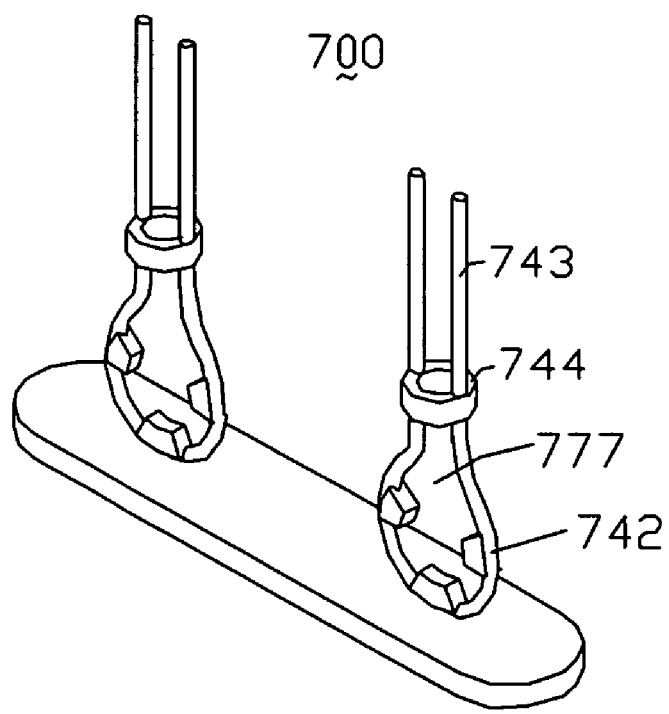
FIG. 7 is a schematic, isometric view of a holder according to a sixth embodiment of the present invention, the holder including a ring-shaped latch element.

Referring to FIG. 7, a backlight module 700 according to a sixth embodiment of the present invention is shown. The backlight module 700 is similar to the backlight module 200 in FIG. 1, except that a ring is integrally formed between and thereby links the two supporting parts 743, the ring being defined as a latch element 744. The ring is arranged in a plane perpendicular to the supporting parts 743. An opening 777 is defined by the two supporting parts 743 and a C-shaped fixing part 742 for securing a lamp 230 (not shown). In a process of assembling the backlight module 700, an operator pushes the lamp 230 (not shown) through the opening 777 and presses against the C-shaped fixing part 742 to secure the lamp 230 in place.

Figure 8:
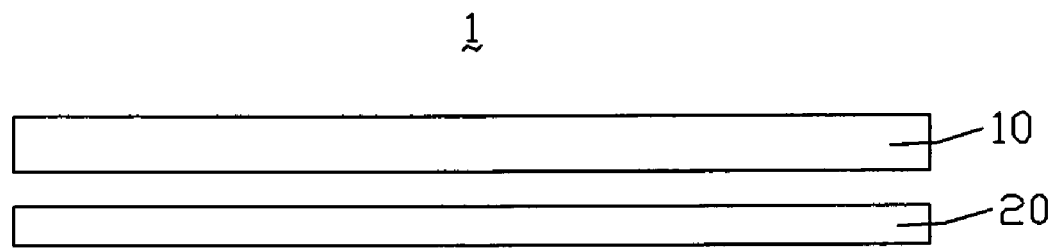
FIG. 8 is a cross-sectional view of an LCD according to an exemplary embodiment of the present invention.
Figure 9:
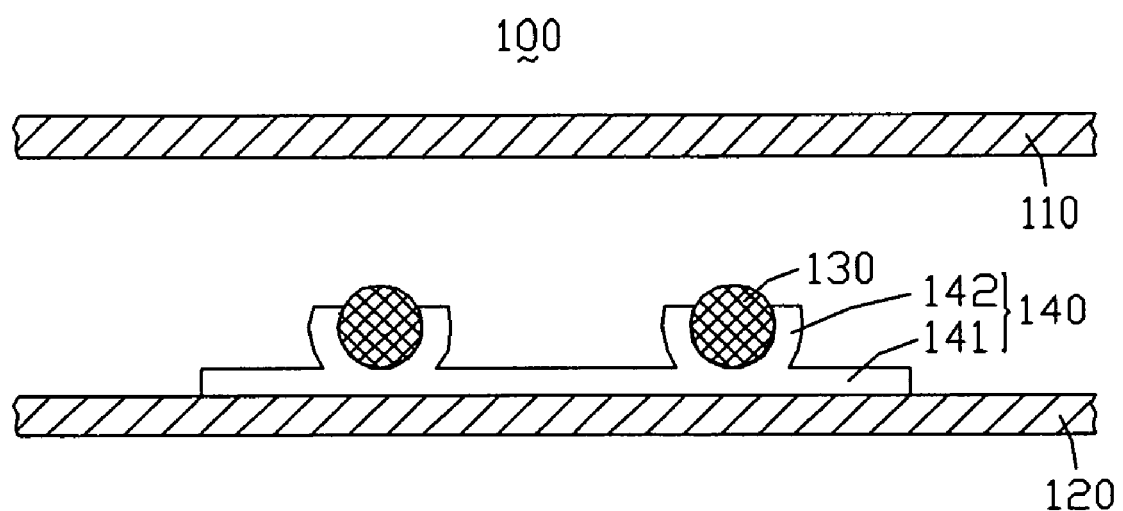
FIG. 9 is a cross-sectional view of a conventional backlight module.

Referring to FIG. 8, a liquid crystal display (LCD) device 1 according to an exemplary embodiment of the present invention is shown. The LCD device 1 includes an LCD panel 10 and a backlight module 20. The backlight module 20 can be any backlight module embodiment.

In an alternative embodiment (not shown) of the present invention, the C-shaped fixing part 242, 742 can be replaced by a U-shaped fixing part and the holder 240 can be formed on the bottom plate 220.

Those skilled in the art will readily appreciate that numerous modifications and alterations of the above-described devices may be made without departing from the scope of the principles of the present invention. Accordingly, the above disclosure should be construed as limited only by the metes and bounds of the appended claims or equivalents thereof.

What is claimed is:

1. A backlight module, comprising:
    a diffuser plate;
    a bottom plate facing the diffuser plate;
    at least one lamp arranged between the diffuser plate and the bottom plate;
    at least one holder positioned between the diffuser plate and the bottom plate, the at least one holder comprising a fixing part for holding the at least one lamp, two supporting parts extending from the fixing part, and an entrance defined between the two supporting parts, at least one of the two supporting parts configured for supporting the diffuser plate; and
    a latch element mounted on at least one of the two supporting parts for locking the two supporting parts together;
    wherein, the at least one lamp is received in the fixing part through the entrance and secured in the fixing part after the latch element locks the two supporting parts together, and the at least one lamp is capable of being taken out of the at least one holder via the entrance after the latch element is unlocked to release the two supporting parts.

2. The backlight module of claim 1, wherein the fixing part of the at least one holder is selected from the group consisting of a C-shaped fixing part and a U-shaped fixing part.

3. The backlight module of claim 1, wherein the at least one holder is formed on the bottom plate.

4. The backlight module of claim 1, wherein the at least one holder further comprises a base part connected to the fixing part for fixing the at least one holder to the bottom plate.

5. The backlight module of claim 4, wherein the base part is glued to the bottom plate.

6. The backlight module of claim 4, wherein the base part is connected to the bottom plate via a fastener.

7. The backlight module of claim 1, wherein the latch element includes a protrusion formed on one of the two supporting parts, and a receiving unit formed on the opposite supporting part for receiving the protrusion.

8. The backlight module of claim 7, wherein a cross-section of the receiving unit is a C-shape, and a cross-section of the protrusion is a round shape.

9. The backlight module of claim 7, wherein cross-sections of the receiving unit and the protrusion are T-shaped.

10. The backlight module of claim 7, wherein cross-sections of the receiving unit and the protrusion are umbrella shaped.

11. The backlight module of claim 1, wherein the latch element includes a C-shaped fixing unit formed on one supporting part and the opposite supporting part slides into the fixing unit via an opening of the C-shaped fixing unit.

12. The backlight module of claim 1, wherein the latch element includes a fixing peg formed on one supporting part with an elastic part at the tip and a through hole formed in the opposite supporting part for receiving the elastic part of the fixing peg in a deformed state therethrough.

13. The backlight module of claim 1, wherein the latch element comprises a ring integrally formed between and thereby linking the two supporting parts.

14. A backlight module, comprising:

a diffuser plate;

a lamp;

a holder comprising a first part and two second parts connecting with the first part, the first part comprising an internal space for holding the lamp therein, two second parts defining an entrance communicating with the internal space of the first part, and at least one supporting part configured for supporting the diffuser plate;

a locking mechanism provided on the two supporting parts for locking and unlocking the two supporting parts;

wherein at least one of the second parts is deformable;

when the locking mechanism is locked, the two supporting parts are fixed together, and the lamp is secured in the first part; and when the locking mechanism is unlocked, at least one of the two supporting parts deforms such that the lamp is removable from or insertable into the holder via the entrance.

15. The backlight module of claim 14, wherein the first part of the holder is selected from the group consisting of a C-shaped first part and a U-shaped first part.

16. The backlight module of claim 14, further comprising a bottom plate facing the diffuser plate, wherein the holder is formed on the bottom plate.

17. The backlight module of claim 16, wherein the holder further comprises a base part connected to the first part for fixing the holder to the bottom plate.

18. The backlight module of claim 14, wherein the locking mechanism includes a protrusion formed on one of the two supporting parts, and a receiving unit formed on the opposite supporting part for receiving the protrusion.

19. The backlight module of claim 18, wherein a cross-section of the receiving unit is a C-shape, and a cross-section of the protrusion is a round shape.

* * * * *

UNITED STATES PATENT AND TRADEMARK OFFICE
CERTIFICATE OF CORRECTION

| | | |
|---|---|---|
| PATENT NO. | : 8,004,628 B2 | Page 1 of 1 |
| APPLICATION NO. | : 12/214964 | |
| DATED | : August 23, 2011 | |
| INVENTOR(S) | : Yi-Fu Lin | |

It is certified that error appears in the above-identified patent and that said Letters Patent is hereby corrected as shown below:

Please replace Item (54) regarding "TITLE" on the front page of the Patent with the following:

-- (54)  BACKLIGHT MODULE --

Signed and Sealed this
Thirty-first Day of January, 2012

David J. Kappos
*Director of the United States Patent and Trademark Office*

UNITED STATES PATENT AND TRADEMARK OFFICE
CERTIFICATE OF CORRECTION

Page 1 of 1

| | |
|---|---|
| PATENT NO. | : 8,004,628 B2 |
| APPLICATION NO. | : 12/214964 |
| DATED | : August 23, 2011 |
| INVENTOR(S) | : Yi-Fu Lin |

It is certified that error appears in the above-identified patent and that said Letters Patent is hereby corrected as shown below:

Title Page, Item (54) and at Column 1, lines 1 and 2, Please replace "TITLE" with the following:

-- BACKLIGHT MODULE --

This certificate supersedes the Certificate of Correction issued January 31, 2012.

Signed and Sealed this
Twenty-first Day of February, 2012

David J. Kappos
*Director of the United States Patent and Trademark Office*